United States Patent [19]
Mulier et al.

[11] 3,927,366
[45] Dec. 16, 1975

[54] METHOD FOR DETERMINING THE END OF LIFE OF A PULSE GENERATOR POWER SOURCE

[75] Inventors: Pieter M. J. Mulier, St. Paul; Thomas L. Jirak, Plymouth; Lawrence M. Kane, Roseville, all of Minn.

[73] Assignee: Medtronic, Inc., Minneapolis, Minn.

[22] Filed: Aug. 20, 1973

[21] Appl. No.: 390,174

Related U.S. Application Data

[62] Division of Ser. No. 256,330, May 24, 1972, Pat. No. 3,857,085.

[52] U.S. Cl. ........ 324/29.5; 128/2.06 R; 128/419 P; 320/48; 340/249
[51] Int. Cl. ............................................. G01n 27/42
[58] Field of Search ...... 324/29.5; 320/48; 340/249; 136/182; 128/2.06 R, 419 PG

[56] References Cited
UNITED STATES PATENTS

| | | | |
|---|---|---|---|
| 3,426,748 | 2/1969 | Bowers | 128/2.06 R |
| 3,517,663 | 6/1970 | Bowers et al. | 128/2.06 R |
| 3,546,576 | 12/1970 | Frezzolini | 340/249 X |
| 3,550,105 | 12/1970 | DeCola et al. | 340/249 |
| 3,593,099 | 7/1971 | Scholl | 320/48 X |
| 3,669,120 | 6/1972 | Nielsen | 128/419 PG |

Primary Examiner—Stanley T. Krawczewicz
Attorney, Agent, or Firm—Lew Schwartz; Wayne A. Sivertson

[57] ABSTRACT

A regulator for a pulse generator which acts to decrease the output of the pulse generator in a linear fashion such that each pulse has an amplitude which is lower by a generally constant known amount than the pulse that immediately preceded it. By stepping down the output of the pulse generator to a critical value, the safety factor of the power source is easily determined and, if the power source loses energy in a manner which is predictable with time, the remaining useful life of the power source may also be determined.

6 Claims, 1 Drawing Figure

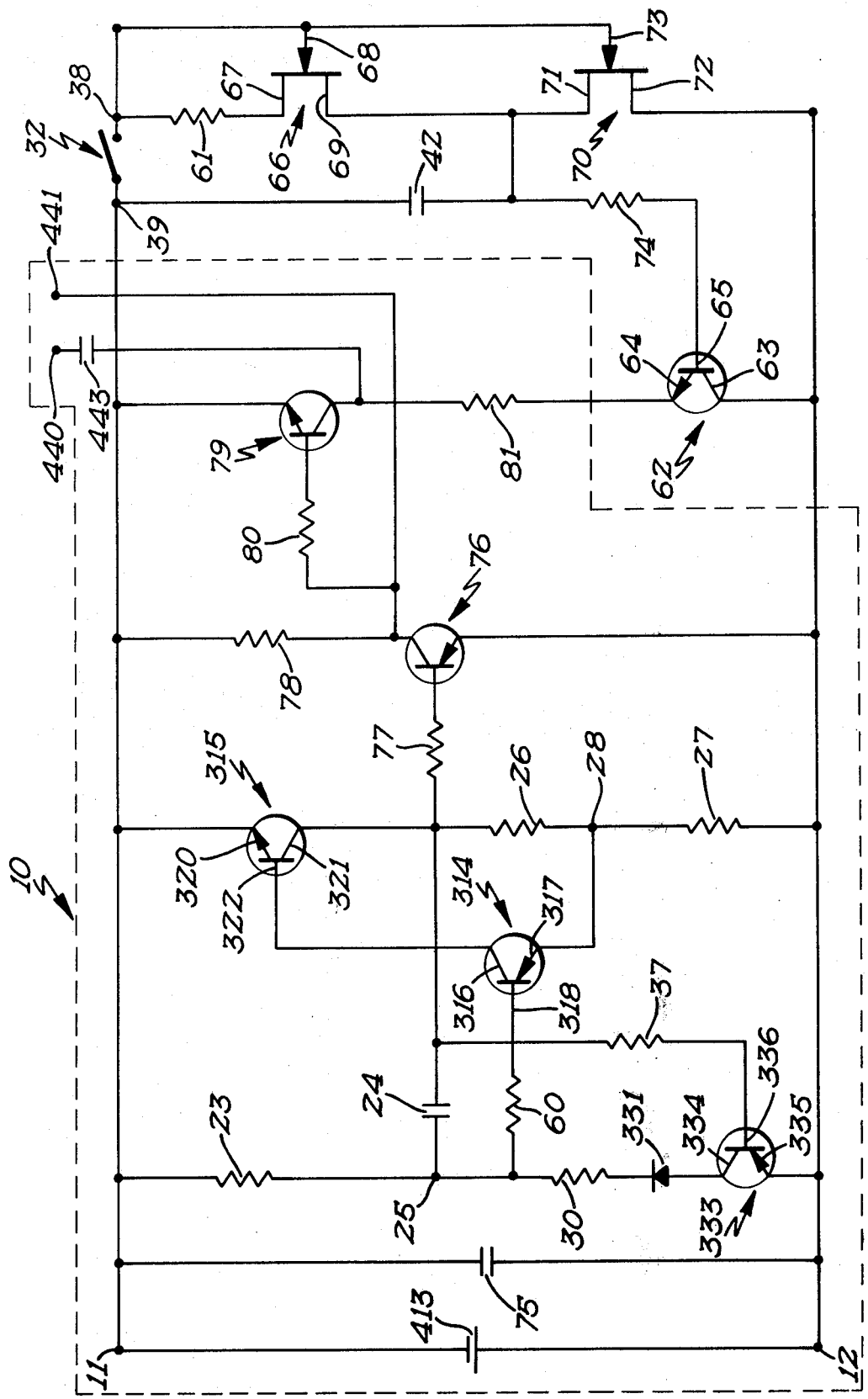

METHOD FOR DETERMINING THE END OF LIFE OF A PULSE GENERATOR POWER SOURCE

CROSS REFERENCE TO RELATED APPLICATION

This application is a division of application Ser. No. 256,330, filed May 24, 1972, now U.S. Pat. No. 3,857,085.

BACKGROUND OF THE INVENTION

There are many uses for pulse generators having a pulse width and pulse repetition rate which are relatively independent of load and supply voltage. One of the areas in which these qualities are very critical is in the use of a pulse generator as a heart stimulator or pacer. Examples of circuits which have the required characteristics for the heart pacer application can be found in U.S. Pat. No. 3,508,167, of Roger B. Russell, Jr., for Pulse Generator. These are essentially semi-conductor circuits in which the semi-conductors are relegated to switching functions making the timing substantially independent of transistor gain characteristics.

In spite of the advances that have been made in the design of circuitry suitable for use in heart pacers, the utility of the entire pacer unit has been severly limited by the characteristics of the available power sources. Typically, these power sources have been chemical-type batteries whose performance is not predictable over a period of time. That is, during the useful life of a chemical battery it will deliver power at approximately the same level. Failure comes fast and at a time which cannot be reliably predicted. Thus, it has become the practice to replace the battery at a time well within its "normal" operating life as the alternative of waiting for battery failure is obviously unacceptable. Since the entire pacer unit (including the power source) is commonly implanted in the patient, battery replacement is a major undertaking.

It is apparent that a testing procedure which could reliably predict pacer battery life without the requirement of surgery would be a great step forward. Such a procedure, however, requires a power source which is itself predictable. Non-chemical power sources whose output predictably varies with time have been developed. An example of such a power source is the Betacel developed by Donald W. Douglass Labs. It is a fueled beta voltaic battery using a promethium-147 isotope. With this type of power source in use, it would be possible to determine its useful remaining life by measuring the voltage output of the pulse generator and the particular patient's capture threshold (the lowest voltage pulse which will stimulate heart action.) Since the power output decreases predictably, it would then be a matter of a simple extrapolation to determine how long it would be before the pulse generator output would fall to or below the capture threshold. The difficulty with this procedure is that it too requires a surgical operation to make the required measurements.

SUMMARY OF THE INVENTION

The present invention provides a semi-conductor circuitry which will cooperate with the existing pulse generating circuitry to provide information, without surgery, as to the particular patient's capture threshold and the end of life of a predictable power source. This is accomplished through a regulator which will decrease the output of the pulse generator in a linear fashion such that each pulse has an amplitude which is lower by a known amount than the pulse that immediately preceded it. If during this decrease the pacer loses capture, the doctor can easily determine the safety factor of the power surce by simply counting the steps (10 steps to loss of capture at 0.25 volt decrease per step, for example, means that the pacer has an output of 2.5 volts more than that required). By a simple extrapolation, the doctor can determine how long the power source will continue to produce pulses greater than the capture threshold or in the alternative, the capture threshold plus a safety factor. This information is made available without surgery as the output regulator is activated through a magnetically operable switch. In addition, when the regulator is not being used it has no appreciable effect on normal pacer operation.

BRIEF DESCRIPTION OF THE DRAWING

The single FIGURE is a schematic of a pulse generating circuit embodying the present invention in a preferred form.

DESCRIPTION OF A PREFERRED EMBODIMENT

The single figure shows a pulse generator 10 operatively connected to the output regulating circuit elements which comprise the present invention. The pulse generator 10 is one that is fully disclosed in this U.S. Pat. No. 3,508,167, of Roger B. Russell, Jr., for Pulse Generator (see FIG. 7). Its operation will be given here in some detail to facilitate the understanding of the present invention. However, the full disclosure of the Russell patent is hereby incorporated in this disclosure to the extent that such incorporation is necessary to complete the instant disclosure. The reference numerals used in FIG. 7 of the Russell patent are used herein to identify functionally similar circuit elements.

Referring now to the FIGURE, a pair of power input terminals 11 and 12 are connected across a power source, here shown as battery 413. The battery 413 is of a type whose output decreases predictably with time. That is, given the present power output of the battery it is possible to reliably predict the amount of time it will take for the battery output to decrease to a predetermined level. A non-chemical example of such a battery is the Betacel described herein above. Any other power source having similar characteristics may also be employed. A pair of electronic switches are here shown as transistors 314 and 315. Transistor 314 includes a pair of current-carrying electrodes, such as collector 316 and emitter 317, and a control electrode here shown as base 318. Transistor 315 also includes a pair of current-carrying electrodes here shown as emitter 320 and collector 321 and a control electrode such as base 322. Collector 316 is directly connected to base 322. Emitter 320 is directly connected to power input terminal 11.

The pulse generator includes a timing circuit with a resistor 23 connected serially to a capacitor 24, between power input terminal 11 and collector 321. A point 25, intermediate resistor 23 and capacitor 24 is connected through a resistor 60 to base 318.

A variable voltage reference, here shown as voltage divider including resistors 26 and 27 is connected between collector 321 and power input terminal 12. A point 28, intermediate resistors 26 and 27, is directly connected to emitter 317. The by-pass or shunt path for operation of timing capacitor 24 includes a serial combination of a resistor 30, a diode 331, and current-carrying electrodes of transistor 333. These current-carrying electrodes are respectively emitter 335 and collector 334. The base 336 of transistor 333 is connected through a resistor 37 to the collector 321 of transistor 315. As will be seen, this transistor 333 functions as a switch which is closed only during the output pulse. The use of transistor 333 in the shunt path is advantageous when the circuit is operated from very low power supply voltages because it eliminates most of the voltage drop acquired across a diode which might otherwise by required. A transistor switch 76 is connected through resistor 77 to collector 321.

In operation, when battery 413 is connected into the circuit, the capacitor 24 begins charging through the resistors 23, 26 and 27. Transistors 314 and 315 are both off and point 28 is essentially at supply voltage. When point 25 reaches a negative voltage level sufficient to forward bias the base emitter junction of transistor 314, transistor 314 begins to turn on. Marginal turn-on of transistor 314 allows sufficient base current to flow in transistor 315 to saturate it almost immediately. Saturation of transistor 315 brings collector 321 to ground potential and transmits a negative-going pulse to transistor switch 76 and simultaneously through capacitor 24 to base 318 of transistor 314 driving it to saturation. This negative-going pulse also turns on transistor 333. During the pulse, current flows from the right plate of the capacitor 24, through the emitter collector circuit of transistor 315, through the battery 413 from the negative to positive terminal, through the emitter collector circuit of transistor 333, diode 331 and resistor 30 to the left plate of capacitor 24. That current causes capacitor 24 to become charged from positive to negative proceding from left to right plate. In addition, as soon as transistor 315 turns on, practically full supply voltage appears across resistors 26 and 27, thus lowering the voltage at point 28 a predetermined amount.

Charging current flowing through the shunt circuit raises the voltage at point 25. When the voltage at point 25 rises to more than the base-emitter voltage drop over the voltage at point 28, transistor 314 turns off which removes the base current from transistor 315 and turns it off also. When transistor 315 turns off collector 321 raises immediately to supply voltage thus producing a positive-going pulse which is transmitted to transistor switch 76 and is simultaneously transmitted through capacitor 24 to base 318 to drive transistor 314 into hard cut-off by driving the base 318 to a potential above the supply voltage.

When transistors 314 and 315 turn off, capacitor 24 discharges and begins to recharge in the opposite direction as current flows from the left plate through the resistor 23, through the battery 413 from the negative to the positive terminal and through the resistors 26 and 27 to the right plate. Capacitor 24 charges in the opposite direction until the potential of point 25 drops sufficiently to again turn off transistor 314.

The transistor switch 76 is one element of the voltage increasing stage which also includes an essential elements a second transistor switch 79 and an output capacitor 443. The emitter of transistor 76 is directly connected to the input terminal 12 while its collector is connected to input terminal 11 through a resistor 78, to the base of transistor 79 through a resistor 80, and directly to output terminal 441. The emitter of transistor 79 is directly connected to input terminal 11 while its collector is connected to the bottom plate of output capacitor 443 as well as to input terminal 12 through the emitter collector circuit of transistor 62 and a resistor 81. The voltage increasing is accomplished through the charging of the output capacitor 443 between pulses. Assuming for now that the transistor 62 is on so that its effect upon the doubling circuitry may be neglected, it can be seen that the bottom plate of output capacitor 443 is charged to approximately supply voltage above the upper plate. The upper plate of the output capacitor 443 and output terminal 441 (which are connected through the load) are at ground potential. At the onset of each pulse, the collector of the transistor 76 goes to approximately supply voltage while the collector of transistor 79 goes to ground. This action immediately drops the voltage at the upper plate below ground potential while the voltage at output terminal 441 goes to nearly supply voltage.

The amount of voltage increasing action is dependent upon the between-pulse charging of the output capacitor 443. If the output capacitor 443 is allowed to charge to nearly supply voltage, the total output voltage will be approximately double the supply voltage. On the other hand, if no between-pulse charging of the output capacitor 443 is accomplished, the output voltage will approximate the supply voltage. From this, it is apparent that the total output voltage may be regulated between supply voltage and double supply voltage by regulating the amount of charge on the output capacitor 443. This is precisely how the regulator of the present invention operates in that a transistor 62, operating as a follower, is used to control the amount of charge on the output capacitor 443. In addition, this regulation is accomplished in a linear fashion in a manner to be explained more fully below, such that each pulse is lower by a constant amount than the puslse which immediately preceded it.

The output regulator of the present invention incorporates, in a preferred embodiment, a transistor 62 including a pair of current-carrying electrodes, such as collector 63 and emitter 64, and a control electrode such as base 65. A capacitor 42 is connected through a resistor 74 to the base 65 of transistor 62 and to a terminal 39. The terminal 39 is connected to input terminal 11. A pair of electronic switches are here shown as field effect devices 66 and 70. Field effect device 66 has a source electrode 67 which is connected through a resistor 61 to a terminal 38, a gate electrode 68 which is directly connected to terminal 38 and a drain electrode 69 connected to capacitor 42 and through resistor 74 to base 65. Field effect device 70 has a source electrode 71 which is connected to the capacitor 42, a drain electrode 72 which is connected to input terminal 12 and a gate electrode 73 which is connected to terminal 38. A switch 32 selectively connects the terminals 38 and 39.

With the switch 32 open, both the field effect devices 70 and 66 are on. The capacitor 42 charges through field effect device 70. When the capacitor 42 is fully charged, the transistor 62 is also fully on thus allowing the pulse generating circuit 10 to operate as if the regulator were not present. When the switch 32 is closed, field effect device 70 is turned off while field effect device 66 remains on. Field effect device 66 and resistor 61 act as a constant current device thus controlling the discharge rate of the capacitor 42. As the capacitor 42 discharges, the transistor 62 is gradually turned off thus disabling the voltage increaser by placing a limit upon the charge build-up on the output capacitor 443 between pulses.

It can be seen that by controlling the discharge rate of the capacitor 42, the turn-off rate of the transistor 62 is similarly controlled. This in turn regulates the charge build-up on output capacitor 443 such that between successive pulses, the charge is lowered by a constant known amount. As has been shown, this decrease in charge build-up accounts for the decrease in amplitude from one output pulse to the next. When the switch 32 is again opened, the charge on capacitor 42 builds up rapidly via field effect device 70 and the pulse regulator 10 is operating in a normal fashion in just a few pulses.

The procedure made possible by the present invention is as follows. The switch 32 is closed to begin the operation of the output regulator. Each successive pulse is then lower in amplitude by a generally constant known amount than the immediately preceding pulse. The person conducting the test merely counts pulses until capture is lost, and then multuplies the number of pulses by the voltage decrease per pulse to obtain a measurement of the amount by which the normal output exceeds the capture threshold. If the power source is of the type which discharges predictably with time, it is a simple matter to refer to a table to determine the amount of time remaining before the pulse generator output will fall to the capture threshold or the level above the capture threshold. If the voltage increaser is completely disabled and capture is not lost, the non-increased pulse generator output voltage may be used as the critical value in place of the capture threshold. The resistor 61 is selected to control the discharge rate of capacitor 42 which in turn determines the decrease in output voltage from pulse to pulse.

The type of switch 32 contemplated by the present invention, is a normally open magnetically operable switch. Such switches are well known and an example of one is the switch commonly referred to as a reed switch. Through the use of such a switch, the output regulator may be activated externally by a magnet. There is no need for a surgical opening. It should be appreciated that it is this type of switch in conjunction with the voltage regulator which makes possible the major advantages of the present invention. That is not to say, however, that in some environments a manual switch may not be employed or that the invention is limited to the use of a particular switch or type of switch. In addition, it is apparent that the regulator described herein may be applied to any pulse generator which employs an output capacitor whether or not there is an output increaser. By regulating the charge on the output capacitor, the pulse generator output is controlled in either case. Also, the regulator of the present invention has a utility in all pacer applications without regard to the power source characteristics in that the capture threshold taking capability is always present. If the power source is any type whose output predictably varies with time, its remaining useful life may also be determined.

It is easy to conceive modifications of the particular embodiment disclosed which are embraced within the concepts of the present invention. Obvious examples of such modifications are a polarity reversal, substitution of complementary transistor types, or the substitution of a field effect device for the transistor 62 with the gate electrode connected as the base 65, the drain electrode connected as the collector 63 and the source electrode connected as the emitter 64. Accordingly, it is to be understood that the embodiment disclosed is given by way of example only while the invention and its scope are defined in the claims as follows:

What is claimed is:

1. A method for determining the end of life of a pulse generator power source which comprises the steps of: providing an output regulating circuit means for the pulse generator; initiating the operating of the output regulating circuit means such that the voltage amplitude decreases in substantially constant decrements from one pulse to the next; sensing the effects of the decrease in voltage amplitude; counting the number of pulses from the time of initiating until the occurrence of a critical event; and determing the useful life remaining in the pulse generator power source.

2. The method of claim 1 wherein the step of initiating comprises the step of closing a normally open switch.

3. The method of claim 1 wherein the step of initiating comprises the step of activating a magnetically operable switch and the step of providing includes the provision of an energy storage device within the output regulating circuit means.

4. The method of claim 3 further comprising the step of charging the energy storage device.

5. The method of claim 4 wherein the step of providing includes the provision of a constant current means which discharges the energy storage device at a constant rate.

6. The method of claim 5 wherein the step of providing futher includes the provision of a transistor means responsive to the discharge rate of the energy storage device.

* * * * *